United States Patent
O'Farrell et al.

(10) Patent No.: US 8,321,845 B2
(45) Date of Patent: Nov. 27, 2012

(54) EXTENSIBLE MARKUP LANGUAGE (XML) PATH (XPATH) DEBUGGING FRAMEWORK

(75) Inventors: William G. O'Farrell, Markham (CA); Mariano Consens, Toronto (CA); John Wen Sheng Liu, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1706 days.

(21) Appl. No.: 11/549,491

(22) Filed: Oct. 13, 2006

(65) Prior Publication Data
US 2008/0091651 A1    Apr. 17, 2008

(51) Int. Cl.
*G06F 9/44*    (2006.01)
(52) U.S. Cl. ......................................................... 717/133
(58) Field of Classification Search .................. None
See application file for complete search history.

(56) References Cited

U.S. PATENT DOCUMENTS

| | | | |
|---|---|---|---|
| 2003/0163285 A1* | 8/2003 | Nakamura et al. ............ | 702/179 |
| 2004/0060007 A1* | 3/2004 | Gottlob et al. ................ | 715/513 |
| 2004/0117769 A1 | 6/2004 | Lauzon et al. | |
| 2005/0022115 A1 | 1/2005 | Baumgartner et al. | |
| 2005/0097084 A1 | 5/2005 | Balmin et al. | |
| 2005/0154705 A1* | 7/2005 | Zwiegincew et al. ............. | 707/1 |
| 2007/0208769 A1* | 9/2007 | Boehm et al. ................. | 707/102 |

OTHER PUBLICATIONS

Geay, Emmanuel; Yahav, Eran; Fink, Stephen. "Continuous Code-Quality Assurance with SAFE." Published Jan. 10, 2006.*
Kim, Larry. "XML Integrated Development Environments Accelerating XML Application Application Development in the Enterprise." Published 2002.*
Bailey, James. "Transformation and Reaction Rules for Data on the Web." Published 2005.*
Abe et al; A Visual Approach to Authorizing XPath Expressions; Markup Languages: Theory and Practice; Dec. 2001, vol. 3, No. 2, pp. 191-212(22), MIT Press (retrieved on Jul. 22, 2005) http://ingentaconnect.com/search/expand?pub=infobike://mitpress/mlang/2001/0000000/0000000.
XPath Editor; Features of XFormation; (retrieved on Jul. 22, 2005 http://www/xformation.com/product/pr03_14.asp.
MacVittie, Lori; XML Security for Web Apps; Network Computing; Jun. 10, 2004 (retrieved Jul. 22, 2005) http://networkcomputing.com/showitem.jhtml?docid=1511sp3.
MacVittie, Lori; Who?s Managing Your Web Services; Network Computing; Jul. 8, 2004 (retrieved Jul. 22, 2005) http://www.nc-india.com/features/stories/53001.html.

* cited by examiner

*Primary Examiner* — Wei Zhen
*Assistant Examiner* — Adam R Banes
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to XPATH expression debugging and provide a novel and non-obvious method, system and apparatus for an XPATH expression debugging framework. In an embodiment of the invention, an XPATH expression debugging method can include receiving an XPATH input expression, parsing the XPATH input expression to produce a group of sub-expressions, and ordering the sub-expressions in a model for the XPATH input expression. Thereafter, in response to a selection of one of the sub-expressions in the model, a result set can be produced for the sub-expression.

14 Claims, 3 Drawing Sheets

EXTENSIBLE MARKUP LANGUAGE (XML) PATH (XPATH) DEBUGGING FRAMEWORK

BACKGROUND OF THE INVENTION

1. Field of the Invention

The present invention relates to the field of markup language processing and more particularly to extensible markup language (XML) path (XPATH) expression traversal of an XML document.

2. Description of the Related Art

XML is a markup language specification widely credited with improving the functionality of the World Wide Web by allowing the identification of information in a more accurate, flexible, and adaptable way. XML is referred to as "extensible" because XML is not a fixed format like the hypertext markup language (HTML) which is a single, predefined markup language. Rather, XML is a meta-language that describes other languages. As such, XML allows for the design of other markup languages for virtually limitless different types of documents. XML can act as a meta-language because XML is written according to the standardized general markup language (SGML)—the international standard meta-language for text document markup.

There are several methods for processing an XML document. In one method, every clause in the XML document is accounted for and a hierarchical model can be constructed reflecting the interrelationships between the clauses of the XML document. Referred to as a document object model (DOM), the DOM tree once in memory can be traversed at will in order to manipulate the XML document. Another method provides for the event-driven serial parsing of clauses in an XML document. Referred to as "SAX" parsing—an acronym for simple application programming interface (API) for XML—consumes a significantly smaller memory footprint than DOM processing as an entire hierarchical model in the form of a DOM tree need not be constructed prior to processing the XML document.

The XPATH language defines expressions for traversing a DOM for an XML document and specifies the set of nodes or the sequence of nodes in an XML document. An XPATH expression, when evaluated by XPATH expression processing logic, can traverse the DOM for an XML document in steps from node to node until a targeted set of nodes or a sequence of nodes is produced. Once the result is produced, the intermediate nodes associated with the requisite XPATH steps are totally forgotten. The intermediate steps, however, express how an XPATH expression is evaluated for a particular XML document. Thus, the intermediate nodes can be important in debugging the effectiveness of an XPATH expression.

BRIEF SUMMARY OF THE INVENTION

Embodiments of the present invention address deficiencies of the art in respect to XPATH expression debugging and provide a novel and non-obvious method, system and apparatus for an XPATH expression debugging framework. In an embodiment of the invention, an XPATH expression debugging method can include receiving an XPATH input expression, parsing the XPATH input expression to produce a group of sub-expressions, and ordering the sub-expressions in a model for the XPATH input expression. Thereafter, in response to a selection of one of the sub-expressions in the model, a result set can be produced for the sub-expression.

In one aspect of the embodiment, parsing the XPATH input expression to produce a group of sub-expressions can include parsing the XPATH input expression to identify expression nodes, step nodes, function nodes, and predicates to the step nodes. Once identified, the nodes can be arranged in an XPATH traversal tree (XTT) model. Additionally, parsing the XPATH input expression to identify expression nodes, step nodes, function nodes, and predicates to the step nodes, further can include identifying parenthesis nodes for the XPATH input expression. In any event, ordering the sub-expressions in a model for the XPATH input expression can include associating each sub-expression with a node in the model, and rendering a visual representation of the model in a user interface for an IDE.

In yet another aspect of the embodiment, producing a result set for the sub-expression, can include computing a result set for a sub-expression associated with a selected node in the model in the user interface, and rendering the result set in a result set view for the user interface. The user interface can include, for example, a navigator view, an XPATH input view, a model view and a result set view. The navigator view can provide an interface for selecting a target XML document, while the XPATH input view can provide an interface for submitting an XPATH input expression and, optionally, a context for evaluating the XPATH input expression. The model view can provide a user interface supporting an interactive visual rendering of the nodes of the model, while the result set view can provide a visual rendering of a result set for a selected node on the model view.

In another embodiment of the invention, an IDE data processing system configured for XPATH expression debugging can be provided. The system can include an IDE user interface, an XPATH expression model generator including program code enabled to produce an XPATH traversal tree (XTT) model for an XPATH input expression, and an XPATH expression debugger. The XPATH expression debugger can include program code enabled to apply a sub-expression to a selected XML document corresponding to a selected node in the XTT model in the IDE user interface. As an example, the IDE user interface can include a user interface to an Eclipse framework implementation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for an XPATH debugger. In accordance with an embodiment of the present invention, an input XPATH expression for application to an XML document can seed an XPATH expression model of sub-expressions. Each of the sub-expressions can resolve to an intermediate step in resolving the input XPATH expression. Thereafter, a graphical representation of the seeded XPATH expression model can be rendered in an integrated development environment user interface. The selection of a node in the XPATH expression model can result in a display of portions of the XML document consistent with an intermediate step for a sub-expression associated with the selected node.

Figure 1:
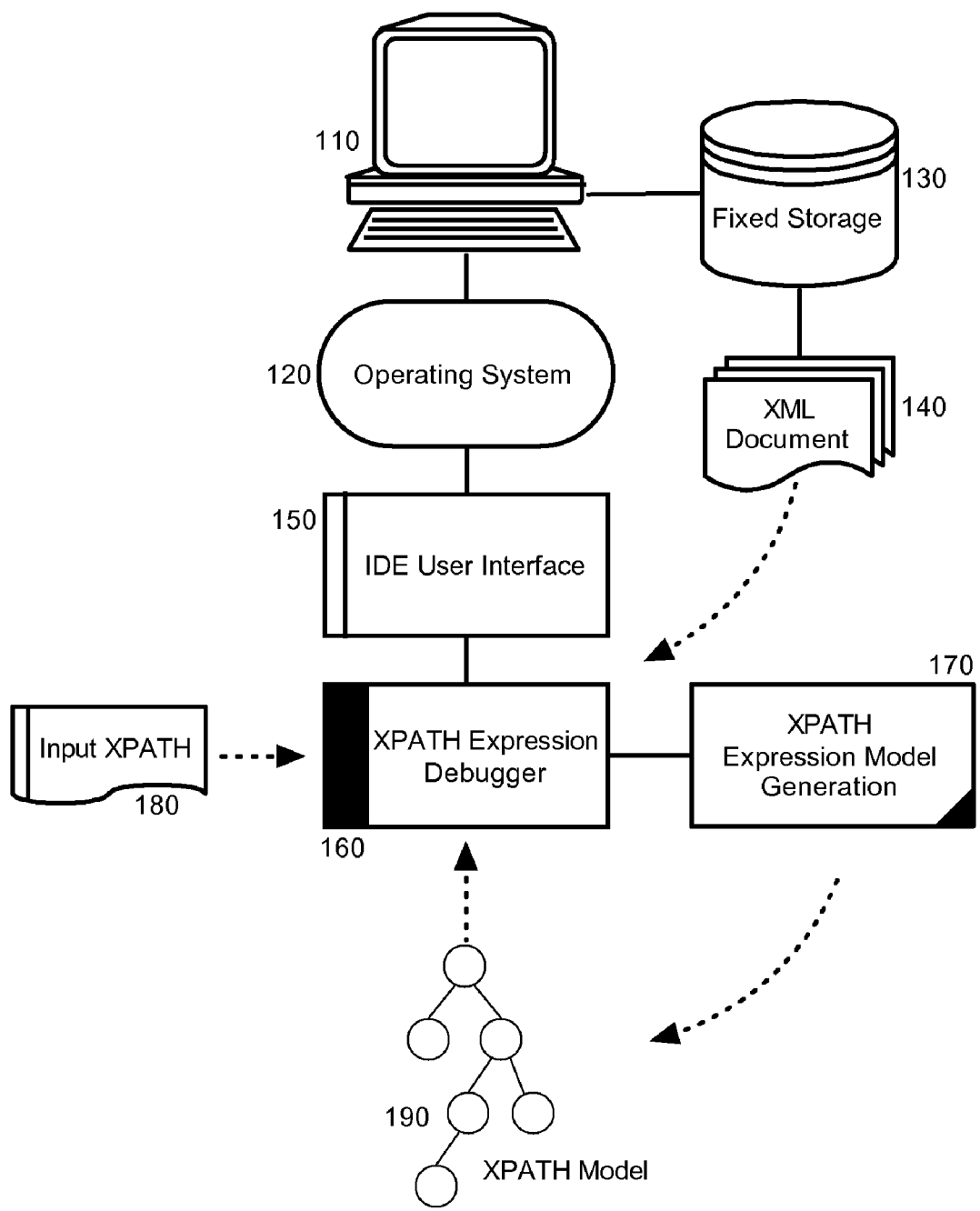
FIG. 1 is a schematic illustration of an XPATH expression debugging data processing system.

In illustration, FIG. 1 depicts an XPATH expression debugging data processing system. As shown in FIG. 1, an XPATH expression debugging data processing system can include a host computing platform 110 supporting an operating system 120. The host computing platform 110 further can include fixed storage 130 in which one or more XML documents 140 can be disposed. The operating system 120 in turn can host the execution of an integrated development environment (IDE) 150 such as that provided by the Eclipse™ framework. Notably, only a single computing platform coupled to a single fixed storage instance is shown in FIG. 1, though the skilled artisan will recognize multiple variants of the shown configuration including multiple host computing platforms remotely accessed by client end users and multiple fixed storage instances accessible from the host computing platforms.

The IDE 150 can be coupled to an XPATH expression debugger 160. The XPATH expression debugger 160 can include program code enabled to debug the evaluation of an input XPATH expression 180 by rendering result sets for intermediate steps of the evaluation of the input XPATH expression 180. To produce the intermediate steps, XPATH expression model generation logic 170 can be coupled to the XPATH expression debugger 160 and can include program code enabled to build an XPATH expression model 190 for the input XPATH expression 180. Different nodes in the XPATH expression model 190 can reflect different sub-expressions for the input XPATH expression 180 such that the evaluation of the different sub-expressions in respect to a specified one of the XML documents 140 can produce respective result sets for corresponding intermediate steps in the evaluation of the input XPATH expression 180.

The XPATH expression model 190 can be an extension of a pattern tree model used for computing XPATH containment. The extension to the pattern tree model can include additional node and token types to seamlessly model XPATH expressions based on XPATH 1.0. In this regard, the XPATH expression model 190 can include a directed and unranked tree modeling an XPATH expression with XPATH traversal tree (XTT) nodes and tokens. An XTT node can include a composite tree node in the XTT to model different kinds of XPATH expressions. In further illustration, FIG. 2 is a class diagram of an XPATH expression model configured to model an XPATH expression model in the system of FIG. 1.

Figure 2:
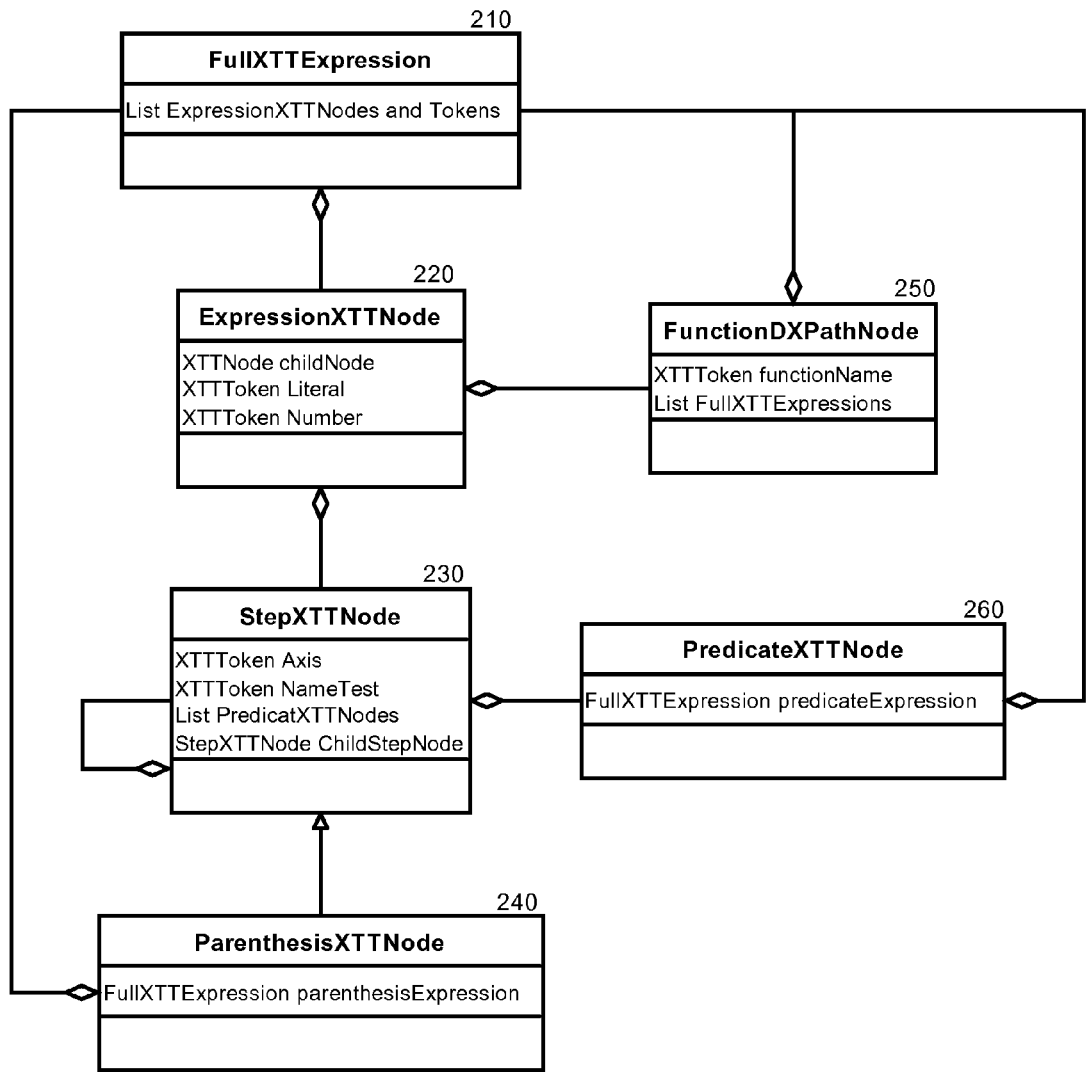
FIG. 2 is a class diagram of an XPATH expression model configured to model an XPATH expression model in the system of FIG. 1.

As shown in FIG. 2, the XPATH expression model can include a FullXTTExpression 210 at its root. An instance of the FullXTTExpression 210 can include a listing of different instances of an ExpressionXTTNode 220 and one or more XTTToken instances. In each regard, an XTTToken is an atomic string token for an XPATH expression and is a smallest meaningful string in an XPATH expression. XTTTokens can include, by way of example, NAME-TEST—the name test of an XPATH step, FUNCTION-NAME—the name of an XPATH function, AXIS—the axis of an XPATH step, LITERAL—any string within quotes, NUMBER—any numerical token, and OPERATOR—the arithmetic and logical operators and operator.

Each instance of an ExpressionXTTNode 220 can encapsulate one or more instances of an XTTToken in the form either of a literal or a number. Exemplary instances of an ExpressionXTTNode 220 can include a literal expression, like "Hello World", a numerical expression like "1" or "1.23", a path expression, like "XYZ", and a function expression, like "name(XY)". However, as shown in FIG. 2, in the case of a literal or numerical expression, the related XTTToken instances can be stored directly in the instance of the ExpressionXTTNode 220. By comparison, for path expressions, the child node can be an instance of an StepXTTNode 230, or an instance of a ParenthesisXTTNode 240. Likewise, for a function expression, the child node can be an instance of a FunctionDXPathNode 250.

Each instance of an ExpressionXTTNode 220 further can encapsulate a reference to a child XTTNode. The child XTTNode can include an instance of a StepXTTNode 230, or an instance of a FunctionDXPathNode 250. The StepXTTNode 230 models a step in the XPATH expression, which contains Axis and NameTest tokens, as well as a list of instances of an PredicateXTTNode 260, and a self reference to a ChildStepNode instance of the instance of the StepXTTNode 230. The Axis and NameTest tokens can store the axis and name test of the given step node. The list of instances of the PredicateXTTNode 260 can include a list of predicate expressions of the instance of the StepXTTNode 230. The size of the predicate list can range from zero to unlimited wherein the ChildStepXTT node instances reflect the next step of the given step node.

The ParenthesisXTTNode 240 models a parenthesis step in an XPATH expression. The parenthesis step node is a special case of a step node, the difference being that the ParenthesisXTTNode 240 contains an instance of a FullXTTExpression 210 instead of Axis and NameTest tokens in an instance of a StepXTTNode 230. The PredicateXTTNode 260 in turn models a predicate expression in an XPATH expression. An instance of the PredicateXTTNode 260 can encapsulate an instance to a FullXTTExpression 210 as the predicate expression. In this regard, since the predicate expression is a full XPATH expression, the predicate expression is modeled by an instance of the FullXTTExpression 210. Finally, the FunctionDXPathNode 250 models a function XPATH expression. An instance of a FunctionDXPathNode 250 can encapsulate a functionName as an instance of an XTTToken. Additionally, an instance of a FunctionDXPathNode 250 can encapsulate a list of FullXTTExpression 250 instances, each instance representing an argument of the function XPATH expression.

Figure 3:
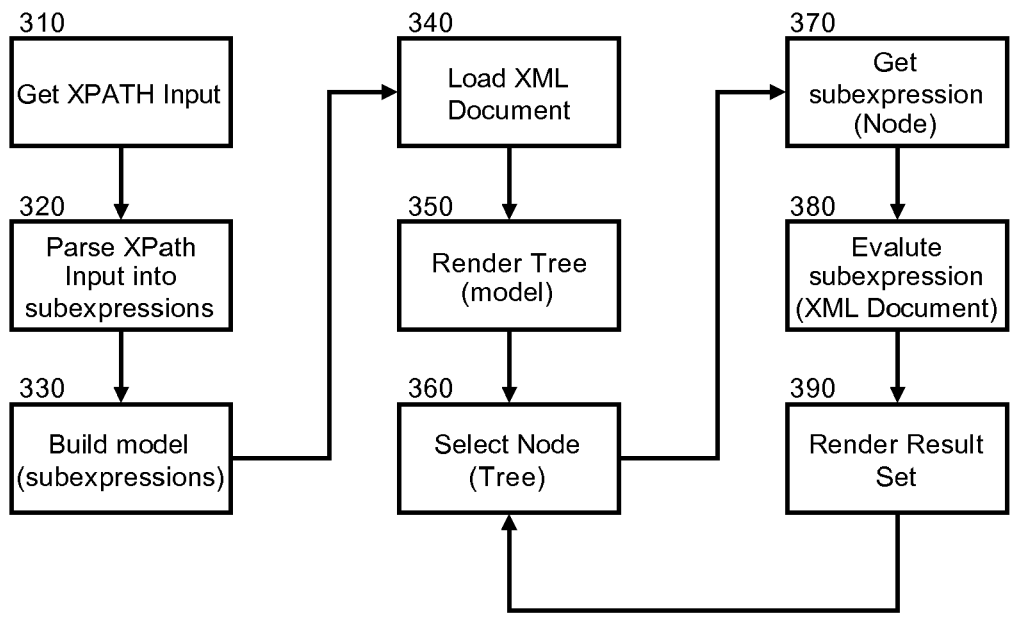
FIG. 3 is a flow chart illustrating a process for debugging an XPATH expression in the system of FIG. 1; and, FIG. 4 is a screen shot of an exemplary user interface for the XPATH expression debugging data processing system of FIG. 1.

Utilizing the XTT model of FIG. 2, the intermediate steps of an XPATH expression can be revealed to facilitate XPATH expression debugging. In further illustration, FIG. 3 is a flow chart illustrating a process for debugging an XPATH expression in the system of FIG. 1. Beginning in block 310, an XPATH input expression can be received for debugging and, in block 320 the XPATH input expression can be parsed into sub-expressions corresponding to intermediate steps of evaluation for the XPATH input expression. In block 330, an XTT model can be constructed with the sub-expressions at different nodes of the XTT model.

In block 340, a subject XML document can be loaded as the target of the XPATH input expression. In block 350, a visual rendering of the XTT model can be provided in hierarchical tree format wherein the nodes of the XTT model can be associated with selectable branches and leaves of the hierarchical tree. Thereafter, in block 360 a node in the XTT model can be selected for evaluation. In response to the selection of a node in the XTT model, a sub-expression corresponding to the selected node can be retrieved in block 370 and in block 380 the sub-expression can be evaluated as against the XML document. Finally, in block 390, the result set for the sub-expression can be rendered for viewing. The repeated selection of different nodes in the XTT model and the resulting rendering of a result set permit the debugger to isolate a point of failure in the XPATH input expression.

Figure 4:
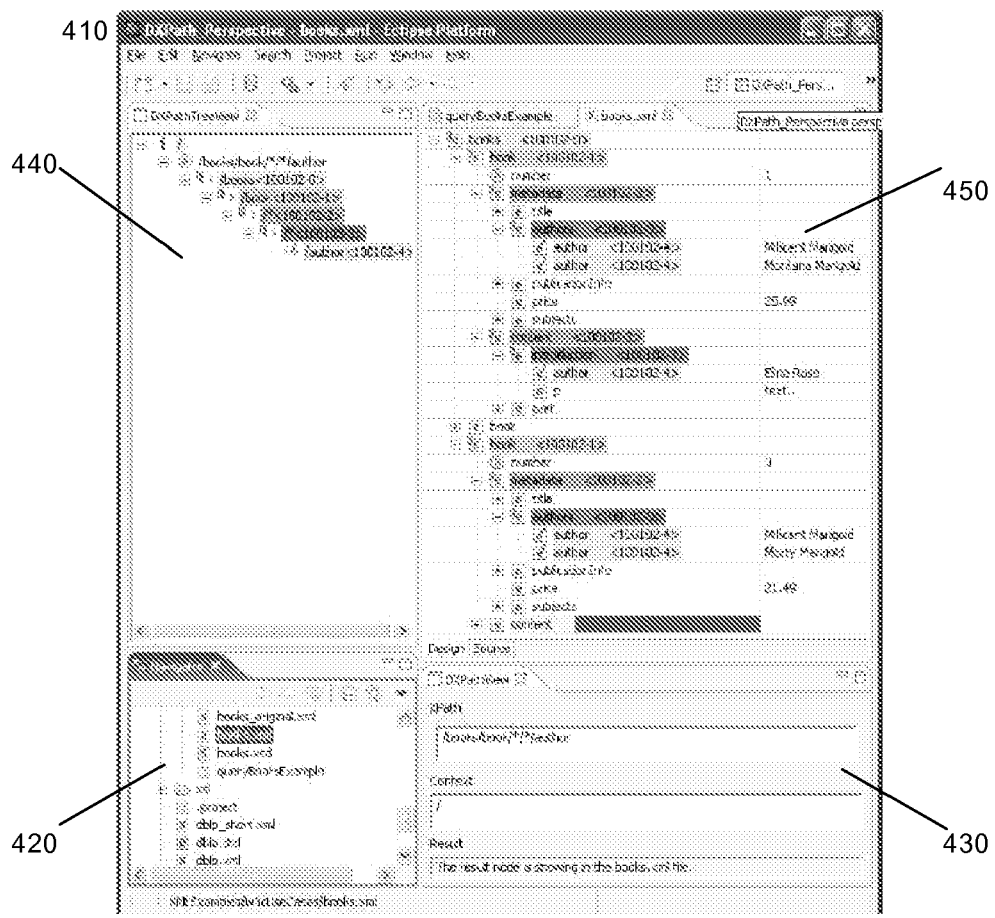

In yet further illustration, FIG. 4 is a screen shot of an exemplary user interface for the XPATH expression debugging data processing system of FIG. 1. The exemplary user interface can include an XPATH debugger view 410 in an IDE. The XPATH debugger view 410 can include a navigator window 420, an XPATH input view 430, a model view 440 and a result set view 450. The navigator view 420 provides a visual interface for selecting a subject XML document, whereas the input view 430 provides a visual interface for providing an XPATH expression and a starting context in an XML document for evaluating the XPATH expression. The model view 440 shows a hierarchical tree view of the XTT model for the XPATH input expression. Finally, the result set view 450 provides a hierarchical view of a result set produced for a selected node in the model view 440.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from at least one computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An extensible markup language (XML) path (XPATH) expression debugging method comprising:
   receiving an XPATH input expression;
   parsing the XPATH input expression to produce a plurality of sub-expressions;
   ordering the sub-expressions in a model for the XPATH input expression by associating each sub-expression with a node in the model;
   responsive to a selection of one of the sub-expressions in the model, producing a result set for the sub-expression by computing a result set for a sub-expression associated with a selected node in the model in a user interface; and
   if the result set does not isolate a point of failure in the XPATH input expression, recursively selecting another sub-expression and computing another result set for said another sub-expression until a point of failure in the XPATH input expression is isolated.

2. The method of claim 1, wherein parsing the XPATH input expression to produce a plurality of sub-expressions, comprises: parsing the XPATH input expression to identify expression nodes, step nodes, function nodes, and predicates to the step nodes; and, arranging the nodes in an XPATH traversal tree (XTT) model.

3. The method of claim 2, wherein parsing the XPATH input expression to identify expression nodes, step nodes, function nodes, and predicates to the step nodes, further comprises identifying parenthesis nodes for the XPATH input expression.

4. The method of claim 1, wherein ordering the sub-expression in a model for the XPATH input expression, comprises:
   rendering a visual representation of the model in a user interface for an integrated development environment (IDE).

5. The method of claim 4, wherein producing the result set for the sub-expression, comprises:
   rendering the result set in a result view for the user interface.

6. An integrated development environment (IDE) data processing system configured for extensible markup language (XML) path (XPATH) expression debugging, the system comprising:
   an IDE user interface presented in a memory of a computer;
   an XPATH expression model generator comprising program code enabled to produce an XPATH traversal tree (XTT) model for an XPATH input expression; and,
   an XPATH expression debugger comprising program code enabled to apply a respective sub-expression of a plurality of sub-expressions to a selected XML document corresponding to a selected node in the XTT model in the IDE user interface to compute a result set for the sub-expression; and
   if the result set does not isolate a point of failure in the XPATH input expression, recursively selecting another sub-expression and computing another result set for said another sub-expression until a point of failure in the XPATH input expression is isolated.

7. The system of claim 6, wherein the IDE user interface is a user interface to an Eclipse framework implementation.

8. The system of claim 6, wherein the XTT model comprises:

a full XPATH expression node for the XPATH input expression; and, a plurality of sub-nodes coupled to the full XPATH expression node in a tree hierarchy, selected ones of the sub-nodes comprising an association with one of a step node, a function node and a predicate node.

9. The system of claim 8, wherein the step node comprises a parenthesis node.

10. A computer program product comprising a physical computer usable medium having computer usable program code for extensible markup language (XML) path (XPATH) expression debugging, the computer program product including:

computer usable program code for receiving an XPATH input expression;

computer usable program code for parsing the XPATH input expression to produce a plurality of sub-expressions;

computer usable program code for ordering the sub-expressions in a model for the XPATH input expression comprising:

computer usable program code for associating each sub-expression with a node in the model;

computer usable program code for, responsive to a selection of one of the sub-expressions in the model, producing a result set for the sub-expression comprising:

computer usable program code for computing a result set for a sub-expression associated with a selected node in the model in a user interface; and computer usable program code for if the result set does not isolate a point of failure in the XPATH input expression, recursively selecting another sub-expression and computing another result set for said another sub-expression until a point of failure in the XPATH input expression is isolated.

11. The computer program product of claim 10, wherein the computer usable program code for parsing the XPATH input expression to produce a plurality of sub-expressions, comprises: computer usable program code for parsing the XPATH input expression to identify expression nodes, step nodes, function nodes, and predicates to the step nodes; and, computer usable program code for arranging the nodes in an XPATH traversal tree (XTT) model.

12. The computer program product of claim 11, wherein the computer usable program code for parsing the XPATH input expression to identify expression nodes, step nodes, function nodes, and predicates to the step nodes, further comprises computer usable program code for identifying parenthesis nodes for the XPATH input expression.

13. The computer program product of claim 10, wherein the computer usable program code for ordering the sub-expressions in a model for the XPATH input expression, comprises:

computer usable program code for rendering a visual representation of the model in a user interface for an integrated development environment (IDE).

14. The computer program product of claim 13, wherein the computer usable program code for producing a result set for the sub-expression, comprises:

computer usable program code for rendering the result set in a result set view for the user interface.

* * * * *